US008842655B2

United States Patent
Mochida et al.

(10) Patent No.: US 8,842,655 B2
(45) Date of Patent: Sep. 23, 2014

(54) COMMUNICATION APPARATUS FOR MULTI ANTENNA SIGNAL PROCESSING

(75) Inventors: Eiji Mochida, Osaka (JP); Mitsuru Hirakawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 179 days.

(21) Appl. No.: 13/128,118

(22) PCT Filed: Oct. 26, 2009

(86) PCT No.: PCT/JP2009/068327
§ 371 (c)(1),
(2), (4) Date: Aug. 2, 2011

(87) PCT Pub. No.: WO2011/053019
PCT Pub. Date: May 14, 2010

(65) Prior Publication Data
US 2011/0286412 A1  Nov. 24, 2011

(30) Foreign Application Priority Data

Jul. 11, 2008  (JP) ................. 2008-286722

(51) Int. Cl.
*H04J 11/00* (2006.01)

(52) U.S. Cl.
USPC ........... 370/344; 370/204; 370/208; 370/536; 375/267; 455/101; 455/102

(58) Field of Classification Search
None
See application file for complete search history.

(56) References Cited

U.S. PATENT DOCUMENTS

| | | | |
|---|---|---|---|
| 6,034,564 A | 3/2000 | Iwamatsu | |
| 6,493,397 B1 | 12/2002 | Takahashi et al. | |
| 7,668,076 B2 | 2/2010 | Yoshida et al. | |
| 8,155,252 B2 * | 4/2012 | Piirainen et al. | 375/344 |
| 2002/0163977 A1 | 11/2002 | Kobayakawa | |

(Continued)

FOREIGN PATENT DOCUMENTS

| | | |
|---|---|---|
| JP | 2000-036801 | 2/2000 |
| JP | 2001-069117 | 3/2001 |

(Continued)

OTHER PUBLICATIONS

Hirakawa et al, "Development of Interference Cancellation Method using Adaptive Array Antenna for Uplink OFDMA in Mobile WiMAX," Vehicular Technology Conference, 2009, VTC Spring 2009, IEEE 69th, Apr. 26-29, 2009. pp. 1-5.

(Continued)

*Primary Examiner* — Donald Mills
(74) *Attorney, Agent, or Firm* — McDermott Will & Emery LLP

(57) ABSTRACT

A communication apparatus capable of simultaneously receiving signals from a plurality of users by an SC-FDMA scheme reduces its circuit size. A communication apparatus BS1, BS2 is capable of simultaneously receiving signals from a plurality of users by the SC-FDMA scheme. The communication apparatus BS1, BS2 includes a plurality of antennas 1a and 1b; a processing unit 6 that performs multi-antenna signal processing on a plurality of received SC-FDMA signals in a frequency domain, the received SC-FDMA signals being received by the plurality of antennas 1a and 1b; and a user separating unit 7 that demultiplexes a signal obtained through the multi-antenna signal processing, into signals for each user based on user allocation information in the SC-FDMA scheme.

8 Claims, 11 Drawing Sheets

(56) References Cited

U.S. PATENT DOCUMENTS

| | | |
|---|---|---|
| 2003/0035469 A1 | 2/2003 | Frank et al. |
| 2004/0005010 A1 | 1/2004 | He et al. |
| 2006/0221808 A1 | 10/2006 | Shirakata et al. |
| 2008/0240311 A1 | 10/2008 | Piirainen et al. |
| 2009/0125793 A1 | 5/2009 | Kishigami et al. |
| 2009/0296638 A1 | 12/2009 | Kimura et al. |
| 2009/0323515 A1 | 12/2009 | Ishikura et al. |
| 2010/0157909 A1 | 6/2010 | Miura et al. |
| 2010/0177697 A1* | 7/2010 | Tanno et al. ............ 370/328 |
| 2011/0158180 A1 | 6/2011 | Melis et al. |

FOREIGN PATENT DOCUMENTS

| | | |
|---|---|---|
| JP | 2004-254290 | 9/2004 |
| JP | 2005-184730 | 7/2005 |
| JP | 2006-295727 | 10/2006 |
| JP | 2007-96468 | 4/2007 |
| JP | 2007-158424 | 6/2007 |
| JP | 2007-306131 | 11/2007 |
| JP | 2008-154223 | 7/2008 |
| JP | 2008-154244 | 7/2008 |
| JP | 2008-167387 | 7/2008 |
| JP | 2008-178044 | 7/2008 |
| JP | 2009-200602 | 9/2009 |
| JP | 2010-278599 | 12/2010 |
| WO | WO 2006/138206 A1 | 12/2006 |
| WO | WO 2007/119280 A1 | 10/2007 |
| WO | WO 2008/032358 A1 | 3/2008 |
| WO | WO 2008/090764 A1 | 7/2008 |
| WO | 2008/096591 A1 | 8/2008 |
| WO | WO 2009/060894 | 5/2009 |
| WO | WO 2010/053019 | 5/2010 |

OTHER PUBLICATIONS

Yamamoto et al, "A Study on Weight Update Method of Adaptive Array Antenna in Mobile WiMAX Antenna System," Proceedings of the 2007 IEICE General Conference Kiso Kyokai 07, Mar. 2007, p. 168, A-5-13.

International Search Report issued in International Patent Application No. PCT/JP2010/068950 dated Feb. 1, 2011.

Mochida et al. Co-pending U.S. Appl. No. 13/501,804, filed Apr. 13, 2012.

Kikuma et al. "Adaptive Signal Processing Using Array Antenna," 1st addition, Kagaku Gijutsu Shuppan, Inc, Nov. 1998.

Yamamoto et al, "A Study on Symbol Timing and Carrier Frequency Synchronization Methods in Mobile WiMAX System," Proceedings of the 2008 IEICE General Conference Kiso Kyokai 05, Mar. 2008. p. 158, A-5-31.

Abe et al, "Matched Filter Approximation of Aa Space-Time SC/MMSE MIMO Turbo Equalizer," Proceedings of the 2002 IEICE General Conference Tsushin 1, Mar. 7, 2002, p. 667, B-5-216.

International Preliminary Examination Report issued in International Patent Application No. PCT/JP2009/068327 dated Jun. 30, 2010.

3GPP TS 36.211 V8.1.0 (Nov. 2007).

Japanese Office Action, and English translation thereof, issued in Japanese Patent Application No. 2009-245337 dated Jun. 11, 2013.

Chinese Office Action, and english translation thereof, issued in Chinese Patent Application No. 200980144469.x dated Apr. 3, 2013.

Office Action issued in corresponding U.S. Appl. No. 13/501,804, dated Nov. 12, 2013.

Final Office Action U.S. Appl. No. 13/501,804 dated Apr. 9, 2014.

U.S. Office Action issued in U.S. Appl. No. 14/087,875 dated Jul. 14, 2014.

R. M. Shubair., "Robust adavptive beamforming using LMS algorithm with SMI initialization," Antennas and Propagation Society International Symposium, 2005 IEEE, 4 pages.

* cited by examiner

COMMUNICATION APPARATUS FOR MULTI ANTENNA SIGNAL PROCESSING

RELATED APPLICATIONS

This application is the U.S. National Phase under 35 U.S.C. §371 of International Application No. PCT/JP2009/068327, filed on Oct. 26, 2009, which in turn claims the benefit of Japanese Application No. 2008-286722, filed on Nov. 7, 2008, the disclosures of which Applications are incorporated by reference herein.

TECHNICAL FIELD

The present invention relates to a communication apparatus using a Single Carrier Frequency Division Multiple Access (SC-FDMA) scheme.

BACKGROUND ART

With the need for improvement in data communication speed, the access scheme for mobile phone systems, etc., is transitioning to HSDPA/HSUPA (High Speed Downlink/Uplink Packet Access). With the aim of further increasing speed and capacity and reducing delay, LTE (Long-Term Evolution) standards development is underway for the next generation scheme.

In LTE, while the downlink employs Orthogonal Frequency Division Multiple Access (OFDMA) which is similar to Worldwide Interoperability for Microwave Access (WiMAX), the uplink employs Single Carrier Frequency Division Multiple Access (SC-FDMA) in consideration of terminal power saving.

FIG. 11 shows an example of processes by the SC-FDMA scheme. User terminals 100a, 100b, and 100c performing transmission by the SC-FDMA scheme each include a DFT unit 101, a zero signal inserting unit 102, an IFFT unit 103, a parallel-to-serial converting unit 104, a CP inserting unit 105, and an FE processing unit 106.

The DFT unit 101 transforms transmitted QAM signals (QAM modulated signals) in which information bits are QAM mapped, into frequency domain signals by an $N_1$-point DFT (Discrete Fourier Transform). Note that $N_1$ indicates the number of transmitted QAM signals transmitted by SC-FDMA symbols, and varies between the user terminals 100a, 100b, and 100c.

Thereafter, the zero signal inserting unit 102 inserts zero signals in bands on a frequency axis in which the user terminal does not transmit data (bands used by the other user terminals).

Then, the IFFT unit 103 transforms the frequency domain signals having the zero signals inserted therein, into time domain signals by an N-point IFFT (Inverse Fast Fourier Transform).

The time domain signals obtained by the IFFT unit 103 are converted into a serial signal by the parallel-to-serial converting unit 104, and then, CPs (Cyclic Prefixes) are appended to the serial signal by the CP inserting unit 105. The serial signal is further subjected to an FE (Front-End) process (D/A conversion, frequency conversion, etc.), and the processed signal is transmitted from an antenna 107 of the user terminal.

A base station apparatus 200 performing reception by the SC-FDMA scheme can simultaneously receive signals from a plurality of users (terminals) by frequency division multiplexing. The base station apparatus 200 has a plurality of receiver circuits 200a, 200b, and 200c provided for respective users, so that the base station apparatus 200 can support simultaneous access from the plurality of users.

Each of the receiver circuits 200a, 200b, and 200c in the base station apparatus 200 includes an FE processing unit 202, a CP removing unit 203, a serial-to-parallel converting unit 204, an FFT unit 205, a zero signal removing unit 206, a transmission path estimating unit 207, a reference signal generating unit 208, a weight computing unit 209, an equalizing unit 210, and an IDFT unit 211.

In the base station apparatus 200, the FE processing unit 202 performs an FE process (frequency conversion, A/D conversion, etc.) on a signal received by an antenna 201. Subsequently, the CP removing unit 203 performs CP removal.

The received signal from which CPs have been removed are converted into parallel signals by the serial-to-parallel converting unit 204. Thereafter, the parallel signals are subjected to an N-point FFT by the FFT unit 205 and are thereby transformed into frequency domain signals.

Furthermore, the zero signal removing unit 206 removes zero signals inserted by a user terminal, the transmitter side, from the frequency domain signals. Note that the bands (subcarriers) in which zero signals are inserted on the transmitter side are identified based on user information indicating frequency bands allocated to the respective user terminals by the base station apparatus.

In addition, the transmission path estimating unit 207 estimates transmission path characteristics from reference signals (known signals) included in the frequency domain signals, and reference signals generated by the reference signal generating unit 208. Then, the weight computing unit 209 computes weights based on the estimated transmission path characteristics.

The equalizing unit 210 performs equalization by adding up the frequency domain signals (received signals) from which zero signals have been removed, with the weights. Then, the IDFT unit 211 performs an IDFT on the signals outputted from the equalizing unit 210, and outputs QAM demodulated signals.

In the base station apparatus 200 performing reception by the SC-FDMA scheme, since each of the receiver circuits outputs QAM demodulated signals for each user, such a number of the receiver circuits are required that corresponds to the number of users allocatable at a time. Therefore, a communication apparatus performing reception by the SC-FDMA scheme has a problem of an increase in its circuit size.

Here, Patent Document 1 discloses a technique in which, in order to reduce the amount of processing of a base station apparatus performing reception by the SC-FDMA scheme, the base station apparatus detects received signal timings from users and makes an adjustment such that the timings coincide, whereby an FFT by the base station apparatus, the receiver side, is performed for all of the users at once.

CITATION LIST

Patent Literature

Patent Literature 1: Japanese Unexamined Patent Application Publication No. 2007-96468

SUMMARY OF INVENTION

Technical Problem

In the base station apparatus of Patent Literature 1, however, although received SC-FDMA signals can be transformed into frequency domain signals by an FFT performed for all users at once, circuits for the respective users are required at a subsequent stage of the FFT.

Namely, the base station apparatus of Patent Literature 1 is configured to select, for each user, some subcarriers from outputs obtained through an FFT and perform, for each user, an equalization process, etc., on the selected subcarriers. Thus, to perform an equalization process, the base station apparatus still requires circuits for the respective users.

An object of the present invention is therefore to provide a new technique to reduce the circuit size of a communication apparatus capable of simultaneously receiving signals from a plurality of users by the SC-FDMA scheme.

Solution to Problem (1) The present invention provides a communication apparatus capable of simultaneously receiving signals from a plurality of users by an SC-FDMA scheme, the communication apparatus including: a plurality of antennas; a processing unit that performs multi-antenna signal processing on a plurality of SC-FDMA signals in a frequency domain, the plurality of SC-FDMA signals being received by the plurality of antennas; and a user separating unit that demultiplexes a signal obtained through the multi-antenna signal processing, into signals for each user, wherein the processing unit is configured to perform the multi-antenna signal processing in the frequency domain, with the plurality of SC-FDMA signals each still including signals for the plurality of users, the plurality of SC-FDMA signals being received by the plurality of antennas, and the user separating unit is configured to demultiplex the signal obtained through the multi-antenna signal processing, based on user allocation information in the SC-FDMA scheme.

When multi-antenna signal processing is performed in the frequency domain, since the processing is performed on a frequency-by-frequency basis, even if the multi-antenna signal processing is performed at once with signals for a plurality of users with different transmission paths being still included, appropriate processing is performed for each frequency band which is associated with each user.

The above-described invention utilizes this fact. According to the communication apparatus of the present invention, multi-antenna signal processing is performed at once, with received SC-FDMA signals still including signals for a plurality of users. Thereafter, the resulting signal can be demultiplexed into signals for each user, based on user allocation information (resource allocation information).

Therefore, a circuit that performs multi-antenna signal processing does not need to be provided for each user, enabling to reduce the circuit size.

Note that although, in the present invention, frequency division multiplexing by the SC-FDMA scheme is performed, in addition to frequency division multiplexing, spatial multiplexing may be performed. That is, a plurality of users may be allocated to one user allocation area by spatial multiplexing. In this case, it is sufficient that a demultiplexing process based on user allocation information be performed for each user allocation area, according to the allocation information.

(2) In the above-described (1), it is preferred that the processing unit perform multi-antenna signal processing by an adaptive array scheme. In this case, interference waves from a user terminal, etc., in another cell which is an interfering station are removed, enabling to improve reception quality. Note that for the adaptive array scheme there are, for example, ZF (Zero-Forcing), MMSE (Minimum Mean Square Error), CMA (Constant Modulus Algorithm), MSN, and CDMP schemes. Note also that for the adaptive array scheme there is also a scheme in which a transfer function of an interference signal is estimated and array combining is performed to cancel out the interference signal. For MMSE, there are LMS, SMI, RLS, NLMS, the Kalman filter, an affine projection method, etc.

(3) In the above-described (1), it is preferred that the processing unit perform multi-antenna signal processing by a diversity scheme. In this case, diversity gain can be attained. Note that, for the diversity scheme, there are selection diversity and combining diversity, and the combining diversity includes equal-gain combining and maximum-ratio combining.

(4) In the above-described (1) to (3), it is preferred that the processing unit calculate weights for the multi-antenna signal processing, on a minimum user allocation unit basis in the SC-FDMA scheme. In the SC-FDMA scheme, a received SC-FDMA signal includes signals for a plurality of users. Since the transmission path characteristics vary between the users, if weights are calculated based on signals received from the plurality of users, then appropriate weights cannot be obtained. On the other hand, by calculating the weights on a minimum user allocation unit basis, it is guaranteed that a weight is calculated based on signals received from the same user, and thus, an appropriate weight can be obtained.

In addition, even in an area allocated to the same user, interference waves in the area may arrive from a plurality of interfering terminals. However, with the minimum user allocation unit, since there is only one interfering terminal, by calculating weights on a minimum user allocation unit basis, interference removal can be appropriately performed.

Note that in LTE the minimum user allocation unit is called a resource block.

(5) In the above-described (1) to (4), it is preferred that the processing unit calculate a weight for a data subcarrier in a minimum user allocation unit in the SC-FDMA scheme, using some of a plurality of reference signals included in the minimum user allocation unit, the some reference signals being near the data subcarrier which is a weight calculation target. By calculating a weight using some of reference signals in a minimum user allocation unit near a data subcarrier which is the weight calculation target, since reference signals for the same user close in frequency and time are used, an appropriate weight is more easily obtained.

(6) In the above-described (1) to (5), it is preferred that the processing unit calculate a weight for a data subcarrier in a minimum user allocation unit in the SC-FDMA scheme, using a weight calculated from a reference signal in the minimum user allocation unit, and a weight calculated from a reference signal in another minimum user allocation unit adjacent in a time direction to the minimum user allocation unit. In the case of a scheme such as LTE in which the same user is allocated the same frequency band consecutively in the time direction, another minimum user allocation unit adjacent in the time direction is also an area for the same user. Therefore, by using a weight that is calculated from a reference signal in another minimum user allocation unit adjacent in the time direction, a weight for a data subcarrier in a minimum user allocation unit can be appropriately interpolated.

(7) In the above-described (1) to (6), the communication apparatus further includes means for generating transmitted signal replicas of signals received by the respective plurality of antennas, based on demodulated signals obtained by demodulating a signal which is array-combined using weights, the weights being calculated from reference signals included in the received signals, and the processing unit can recalculate the weights using the transmitted signal replicas. In this case, since transmitted signal replicas can also be used as virtual reference signals, the reference signals are substantially increased in number, enabling to improve weight estimation accuracy.

(8) In the above-described (1) to (7), the communication apparatus further includes means for generating transmitted signal replicas of signals received by the plurality of antennas, based on signals obtained by performing error correction on demodulated signals, the demodulated signals being obtained by demodulating a signal which is array-combined using weights, the weights being calculated from reference signals included in the received signals, and the processing unit can recalculate the weights using the transmitted signal replicas. In this case, too, since transmitted signal replicas can also be used as virtual reference signals, the reference signals are substantially increased in number, enabling to improve weight estimation accuracy. Moreover, since error is corrected by error correction and then transmitted signal replicas are generated, the accuracy of the transmitted signal replicas is improved and thus the weight estimation accuracy can also be improved.

Advantageous Effects of Invention

According to the present invention, a circuit that performs multi-antenna signal processing using weights does not need to be provided for each user, enabling to reduce the circuit size.

MODE FOR CARRYING OUT THE INVENTION

A preferred embodiment of the present invention will be described below with reference to the accompanying drawings. Note that, although in the present embodiment, LTE (Long-Term Evolution) is described as an example of a communication scheme, the communication scheme is not limited thereto.

Figure 1:
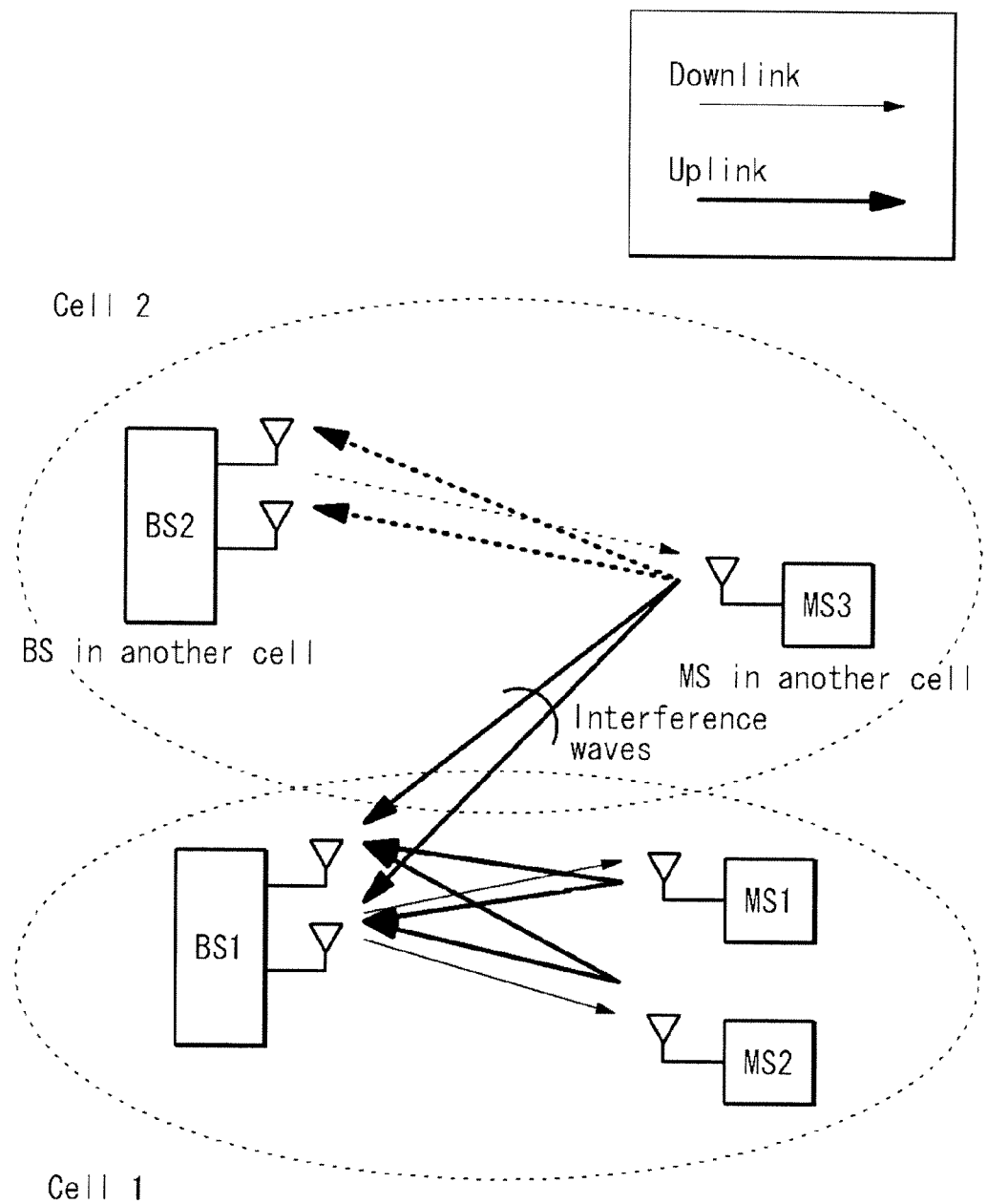
FIG. 1 is an overall view of a wireless communication system.

FIG. 1 shows a wireless communication system using the LTE scheme (e.g., a communication system for mobile phones). As shown in FIG. 1, this communication system employs a cell configuration, and base station apparatuses BS1 and BS2 are installed in respective cells.

The base station apparatuses BS1 and BS2 perform communication with mobile stations (user terminals) MS1, MS2, and MS3 in the cells. In addition, each base station apparatus BS1 can perform simultaneous communications with the plurality of mobile stations MS1 and MS2 in its cell.

Figure 11:
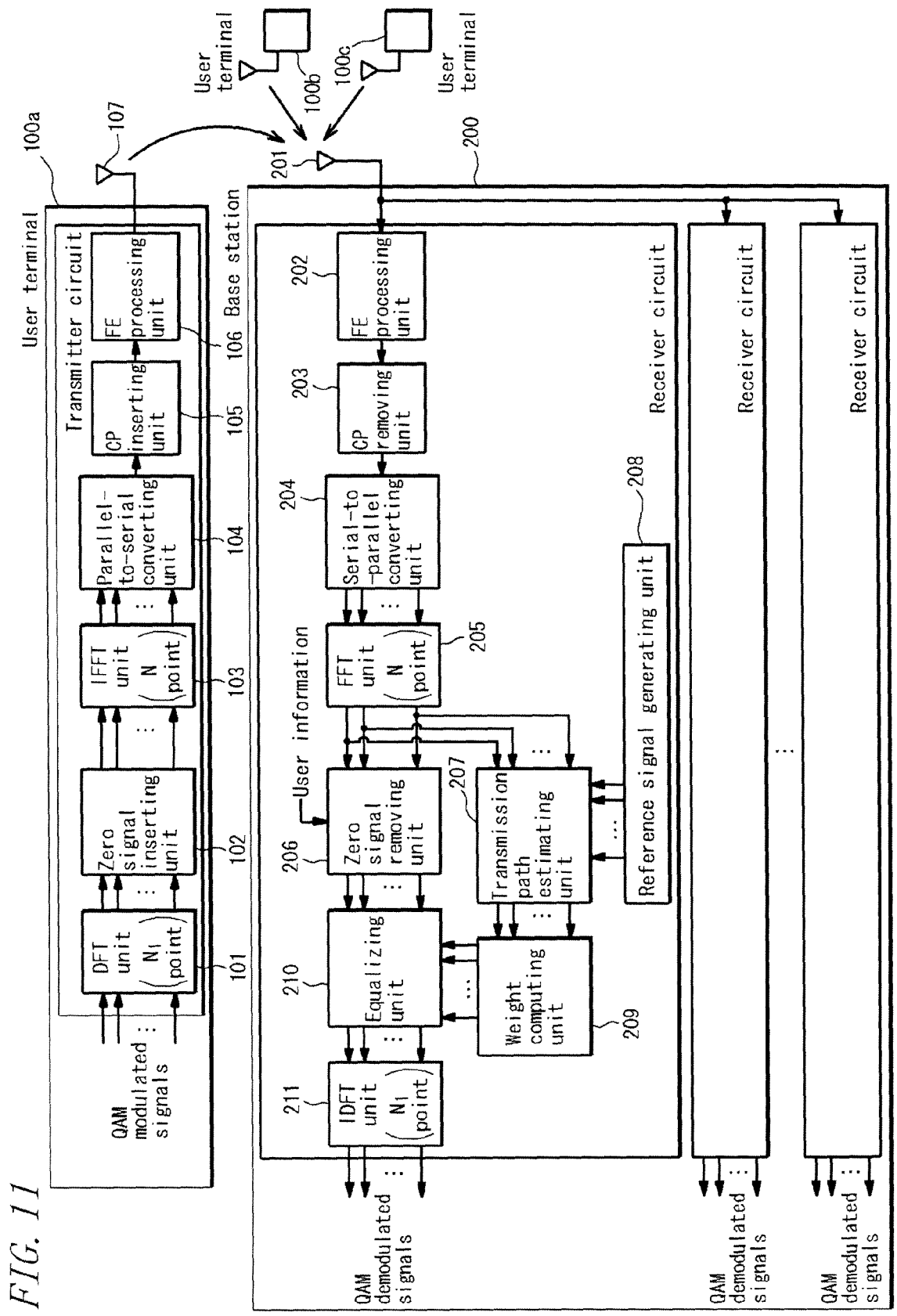
FIG. 11 is a block diagram showing a general SC-FDMA transceiver system.

In this communication system, the downlink employs Orthogonal Frequency Division Multiple Access (OFDMA) and the uplink employs Single Carrier Frequency Division Multiple Access (SC-FDMA). Hence, the base station apparatuses BS1 and BS2 each have a transmitter circuit that supports the OFDMA scheme; and a receiver circuit that supports the SC-FDMA scheme. The mobile stations MS1, MS2, and MS3 each have a transmitter circuit that supports the SC-FDMA scheme (which is the same as the transmitter circuit of the user terminal in FIG. 11); and a receiver circuit that supports the OFDMA scheme.

Figure 2:
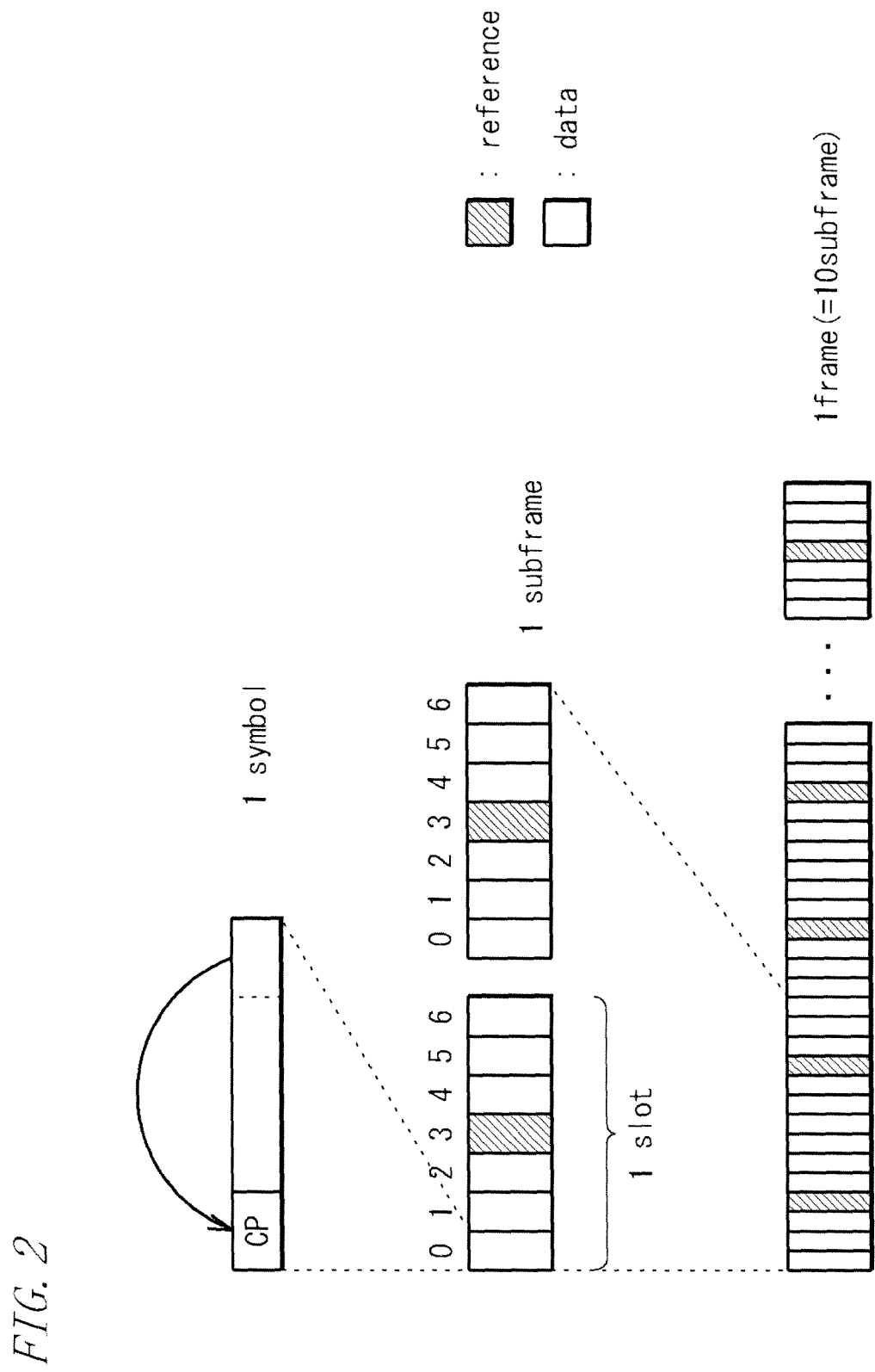
FIG. 2 is a diagram of an LTE uplink frame structure.

FIG. 2 shows an LTE uplink frame structure. This frame is shared by a plurality of mobile stations by frequency division multiplexing, enabling multiple access to a base station apparatus. In addition to frequency multiplexing, spatial multiplexing may be performed. Note that the mobile stations achieve frame synchronization by random access by the base station apparatus.

As shown in FIG. 2, one LTE uplink frame consists of 10 subframes arranged in a time-axis direction, and has a time length of 10 [ms].

One sub frame consists of two slots arranged in the time-axis direction, and has a time length of 1 [ms]. One slot consists of seven (or six) symbols (SC-FDMA symbols) arranged in the time-axis direction, and has a time length of 0.5 [ms].

To the front of each SC-FDMA symbol is appended a copy of the last portion of the symbol, as a CP (Cyclic Prefix). Note that each SC-FDMA symbol consists of N subsymbols (N is an integer greater than or equal to 2) which are modulated data symbols (QPSK modulated data symbols, QAM modulated data symbols, etc.).

Figure 3:
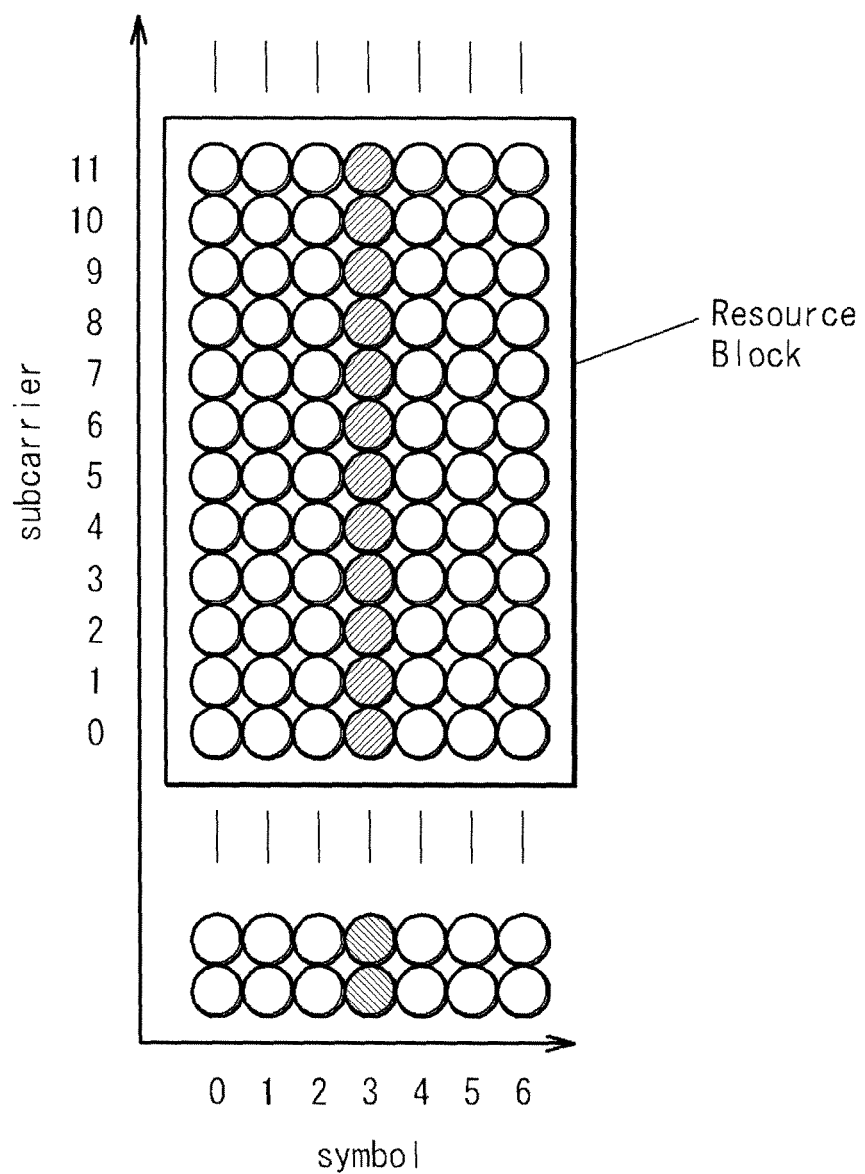
FIG. 3 is a diagram showing a resource block in a two-dimensional arrangement with a time (symbol) axis and a frequency (subcarrier) axis.

In an LTE data channel, the fourth symbol (symbol number 3) in a slot has a reference signal which is a known signal, and other symbols have data signals. As also shown in FIG. 3, in the fourth symbol (symbol number 3) in a slot, all subcarriers have reference signals.

In LTE, a minimum user allocation unit, called a resource block, is set and one resource block includes seven or six symbols×12 subcarriers. In LTE, when viewed in the time-axis direction (symbol direction), the same subcarrier (frequency band) is allocated to the same user. Namely, a plurality of resource blocks arranged consecutively in the time-axis direction are allocated to the same user.

Note that one resource block corresponds to one slot when viewed in the symbol direction (time-axis direction).

Note that user allocation (frequency allocation) is determined by the base station apparatuses BS1, BS2, and BS3, and the determined user allocation information (user information; MAP information) is notified to each of the mobile stations MS1, MS2, and MS3 using a downlink frame. The mobile stations MS1, MS2, and MS3 perform uplink communication using their respective frequencies (subcarriers) allocated by the base station apparatuses.

Figure 4:
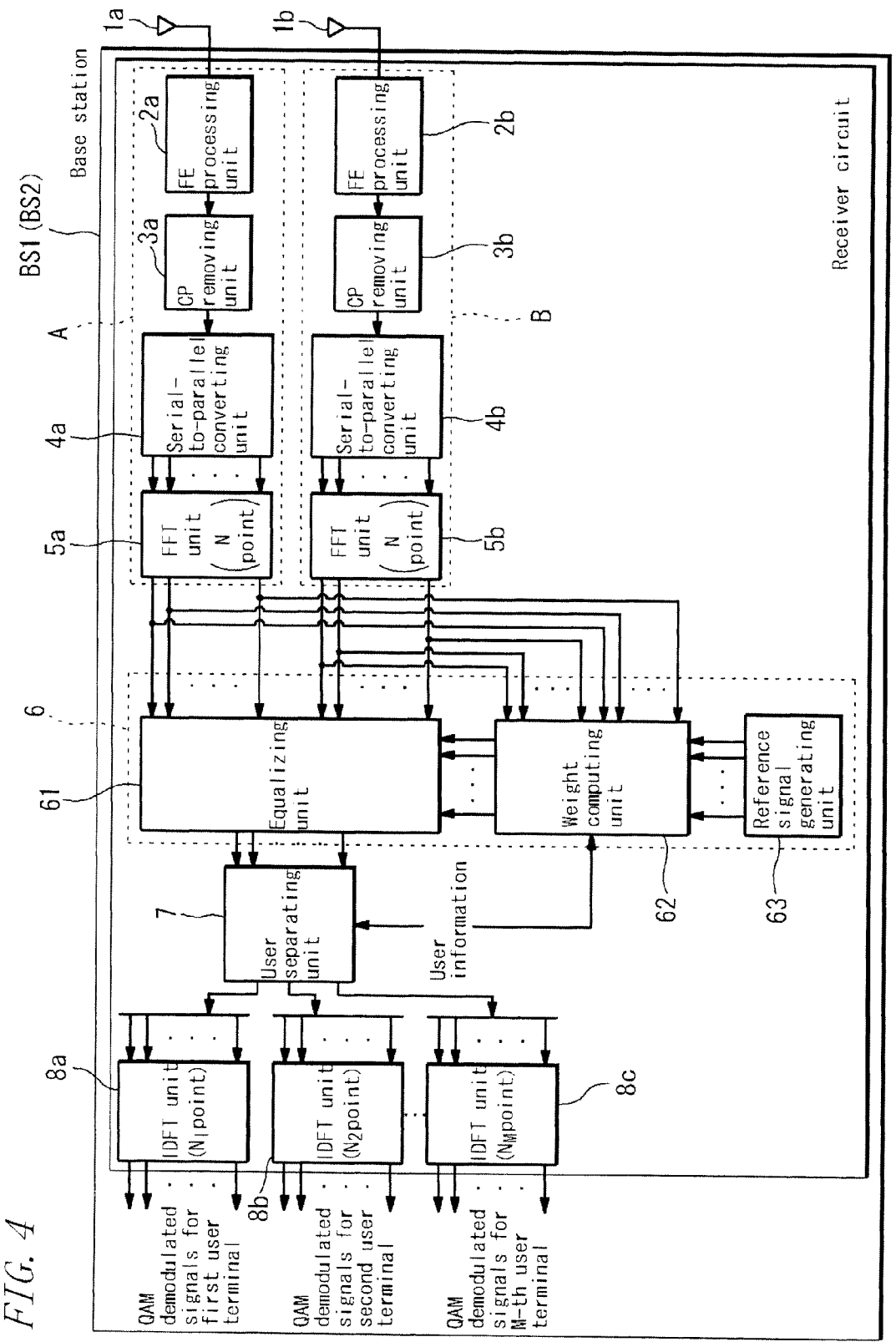
FIG. 4 is a block diagram of a base station apparatus according to an embodiment.

FIG. 4 shows a receiver circuit in each of the base station apparatuses BS1 and BS2 according to the present embodiment. The receiver circuit supports a plurality of users. Thus, unlike the base station apparatus in FIG. 11 in which one receiver circuit is provided for one user, the single receiver circuit can output demodulated signals (QAM demodulated signals; QAM demodulated data symbols) for a plurality of users.

This base station apparatus has a plurality of antennas (two antennas in FIG. 4) 1*a* and 1*b* to perform multi-antenna signal processing such as adaptive array or diversity.

The base station apparatus further has processing sequences A and B, the number of which corresponds to the number of the antennas 1*a* and 1*b*. Received signals received by the respective antennas 1*a* and 1*b* can be transformed into frequency domain signals by the respective processing sequences A and B associated with the respective antennas.

The processing sequences A and B respectively include FE processing units 2*a* and 2*b*, CP removing units 3*a* and 3*b*, serial-to-parallel converting units 4*a* and 4*b*, and FFT units 5*a* and 5*b*.

The FE processing units 2*a* and 2*b* perform an FE process (frequency conversion, A/D conversion, etc.) on signals (SC-FDMA signals) received by the respective antennas 1*a* and 1*b*.

Subsequently, the CP removing units 3*a* and 3*b* perform CP removal.

The received signals from which CPs have been removed are converted into parallel signals by the serial-to-parallel converting units 4*a* and 4*b*, respectively. Thereafter, the parallel signals are subjected to an N-point FFT (Fast Fourier Transform) by the FFT units 5*a* and 5*b*, respectively, and are thereby transformed into frequency domain signals.

The FFT units 5*a* and 5*b* in the processing sequences A and B each output frequency domain signals for all communication frequency bands (all frequency bands for uplink communication) of the base station apparatus. That is, in the frequency domain signals outputted from each of the processing sequences A and B, SC-FDMA signals for a plurality of users are not demultiplexed and thus the frequency domain signals still include signals for the plurality of users.

A plurality of frequency domain SC-FDMA signals outputted from the plurality of processing sequences A and B are provided to a single multi-antenna signal processing unit 6, with the frequency domain SC-FDMA signals still including signals for the plurality of users. Therefore, the base station apparatus of the present embodiment does not require the process of removing, after an FFT, zero signals inserted in those bands other than each user's band.

The multi-antenna signal processing unit 6 performs multi-antenna signal processing, such as adaptive array or diversity, on the plurality of frequency domain signals received by the plurality of antennas 1*a* and 1*b* in the frequency domain to combine the signals, and outputs a single signal as a processing result.

When the multi-antenna signal processing unit 6 performs multi-antenna signal processing by an adaptive array scheme, interference waves from the mobile station MS3 in another cell which is an interfering station are removed, enabling to improve reception quality. Note that for the adaptive array scheme there are a ZF scheme and an MMSE scheme, and in these schemes the receiver side computes weights using known signals (reference signals).

In addition, for the adaptive array scheme, there are also a CMA scheme, MSN and DCMP schemes, etc. In CMA, weights are computed using the constant envelope property of reference signals. In MSN and DCMP, weights are computed with the arrival direction of a desired signal being known. In addition, for the adaptive array scheme, there is also a scheme in which a transfer function of an interference signal is estimated and array combining is performed to cancel out the interference signal.

Here, the ZF scheme is a scheme to apply weights that are obtained when a combined output signal=transmitted signals, ignoring noise.

On the other hand, the MMSE scheme is a scheme to apply a weight w at which the error power (mean square error) of a combined output signal with respect to a reference signal becomes minimum. When the reference signal (pilot signal) is s(i) and the received signal is x(i), the MMSE scheme is represented by the following equation:

$$E[|e(i)|^2]=[|s(i)-w^H x(i)|^2] \to \min \qquad \text{[Equation 1]}$$

Since the MMSE scheme has the capability of removing interference waves, even when the interference wave component of the received signal is large, the reception quality can be improved. That is, in the case of a communication system with a cell configuration such as that shown in FIG. 1, the base station apparatus BS1 may receive interference waves from the mobile station MS3 in another cell; however, with the MMSE scheme, the interference waves from another cell can be removed.

The MMSE scheme includes LMS (Least Mean Square) based on a steepest descent method, RLS (Recursive Least Square), SMI (Sample Matrix Inversion) which is a direct method using a sample value, NLMS (Normalized LMS), the Kalman filter, an affine projection method, etc.

For an arrival direction estimation method in the MSN and DCMP schemes, there are MUSIC, ESPRIT, MODE, and Capon methods, a linear prediction method, a Fourier method, etc.

Weights in each of the above-described schemes are calculated by a weight computing unit 62 according to an algorithm based on each of the above-described schemes. Specifically, the weight computing unit 62 calculates weights by, for example, estimating transmission path characteristics for each frequency (for each subcarrier) using reference signals included in a plurality of frequency domain signals (SC-FDMA signals) received by the plurality of antennas 1*a* and 1*b*, and reference signals (known signals) generated by a reference signal generating unit 63. Note that an example of calculating weights using SMI will be described later.

The weight computing unit 62 calculates weights for all communication frequency bands (all frequency bands for uplink communication) of the base station apparatus. Since a weight is calculated for each frequency (subcarrier), even if the transmission path characteristics greatly vary between the frequencies (subcarriers) because different frequencies (subcarriers) are used by different users, weights can be appropriately calculated.

In addition, the weight computing unit 62 computes a weight for each area which is guaranteed to be provided for the same user (a two-dimensional area represented by the time axis and the frequency axis; see FIG. 3). Hence, the weight computing unit 62 computes a weight for each resource block which is the minimum user allocation unit, by ZF, SMI, etc. By determining a weight for each resource block which is the minimum user allocation unit, a weight can be computed using only reference signals transmitted from the same user, and thus, a weight can be prevented from being inappropriately calculated using reference signals transmitted from a different user. Note that this point will be described later.

The plurality of frequency domain SC-FDMA signals are provided to an equalizing unit 61 in the processing unit 6. In the equalizing unit 61, the plurality of SC-FDMA signals, each still including signals for the plurality of users, are added up with the weights calculated for all communication frequency bands (all frequency bands for uplink communication) of the base station apparatus, and are thereby combined.

The multi-antenna signal processing unit 6 can also perform multi-antenna signal processing by a diversity (antenna diversity) scheme in the frequency domain, instead of multi-antenna signal processing by the adaptive array scheme. For the diversity scheme, there are selection diversity and combining diversity. The selection diversity is a scheme to select a high-quality signal from among signals received by a plurality of antennas. In this case, selecting a signal is equivalent to setting weights, with which unselected signals are added up, to 0. In the combining diversity, by multiplying a plurality of signals by weights to combine the signals, signal quality can be improved. Note that the combining diversity includes equal-gain combining and maximum-ratio combining.

Note that, when the processing unit 6 performs a process by the diversity scheme, too, a plurality of SC-FDMA signals, each still including signals for a plurality of users, are the processing target, and thus, a signal still including signals for the plurality of users is outputted.

Figure 5:
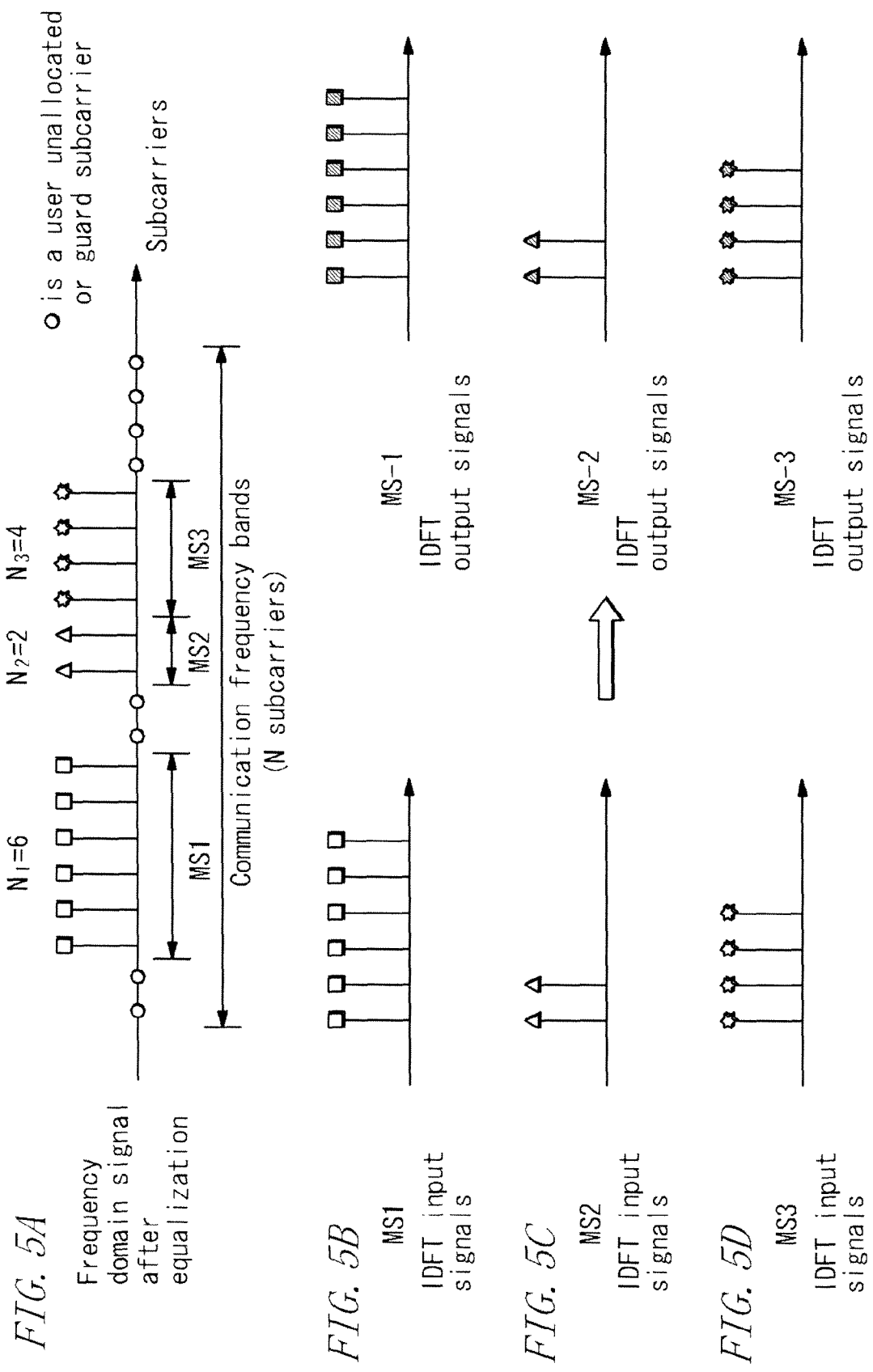
FIG. 5A is a diagram showing a frequency domain signal after equalization (before user separation)
FIG. 5B is a diagram showing signals for user 1 (MS1)
FIG. 5C is a diagram showing signals for user 2 (MS2)
FIG. 5D is a diagram showing signals for user 3 (MS3).

FIG. 5A shows a frequency domain signal outputted from the equalizing unit 61. The signal is demultiplexed by a user separating unit 7 into signals for each user (FIGS. 5B to 5D). The user separating unit 7 performs user separation of the frequency domain signal, based on user information indicating frequency allocation to the users (user allocation information in the SC-FDMA scheme).

For example, it is assumed that, in the communication frequency bands, frequency allocation to a first user terminal MS1, a second user terminal MS2, and a third user terminal MS3 is as shown in FIG. 5A. Note that in FIG. 5A a band for $N_1$ subcarriers is allocated to the first user terminal MS1, a band for $N_2$ subcarriers is allocated to the second user terminal MS2, and a band for $N_3$ subcarriers is allocated to the third user terminal MS3.

The user separating unit 7 demultiplexes, as shown in FIG. 5B to FIG. 5D, the frequency domain signal shown in FIG. 5A into signals for each user, based on user information indicating the above-described frequency allocation.

The signals (frequency domain signals) for each user outputted from the user separating unit 7 are subjected to an Inverse Discrete Fourier Transform (IDFT) by IDFT units 8a, 8b, and 8c which are provided for the respective users. The IDFT units 8a, 8b, and 8c transform the frequency domain signals for each user into time domain QAM demodulated signals. Note that the number of IDFT points at demodulation is according to the size $N_1$, $N_2$, and $N_3$ of a band allocated to each user.

Meanwhile, when the weight computing unit 62 computes weights, in the present embodiment, as described previously, weights are determined on a resource block basis.

[Weight Computation Method 1]

Specifically, for example, when computing weights by SMI, the weight computing unit 62 computes an SMI weight from received signal vectors with respect to 12 reference signals included in each resource block, and the SMI weight can be applied to all data subcarriers included in that resource block.

An SMI algorithm is a method in which a correlation matrix R and a correlation vector p are computed from sampled received signals and reference signals, and an SMI weight w is directly computed from the correlation matrix R and the correlation vector p. The SMI algorithm is represented by the following equation:

$$w = R^{-1}p \quad \text{[Equation 2]}$$

$$\text{Correlation matrix } R = \frac{1}{N}\sum_{i=1}^{N} x(i) \cdot x(i)^H$$

$$\text{Correlation vector } p = \frac{1}{N}\sum_{i=1}^{N} x(i) \cdot s(i)^*$$

$x(i)^H$ represents the complex conjugate transpose of x(i).

$s(i)^*$ represents the complex conjugate of s(i).

Since it is guaranteed that received signal vectors with respect to a plurality of reference signals included in one resource block are all transmitted from the same user (mobile station) and data subcarriers included in the resource block are also transmitted from the same user, by determining a weight in the above-described manner, there is no possibility that a weight is calculated using reference signals transmitted from another user. Thus, appropriate weight calculation can be performed.

[Weight Computation Method 2]

In addition, even when determining weights on a resource block basis, it is not necessary to use received signal vectors with respect to all reference signals included in the resource block. It is also possible that a weight is computed from received signal vectors with respect to some of 12 reference signals in the resource block located near a data subcarrier which is the weight calculation target, without considering those reference signals located away from the data subcarrier which is the weight calculation target.

More specifically, in FIG. 3, a weight for a subcarrier with subcarrier number 0 can be computed only from, for example, received signal vectors with respect to reference signals with subcarrier numbers 0 to 2 near subcarrier number 0. Also, a weight for subcarrier number 5 can be computed only from, for example, received signal vectors with respect to reference signals with subcarrier numbers 3 to 7 near subcarrier number 5.

[Weight Computation Method 3]

Figure 6:
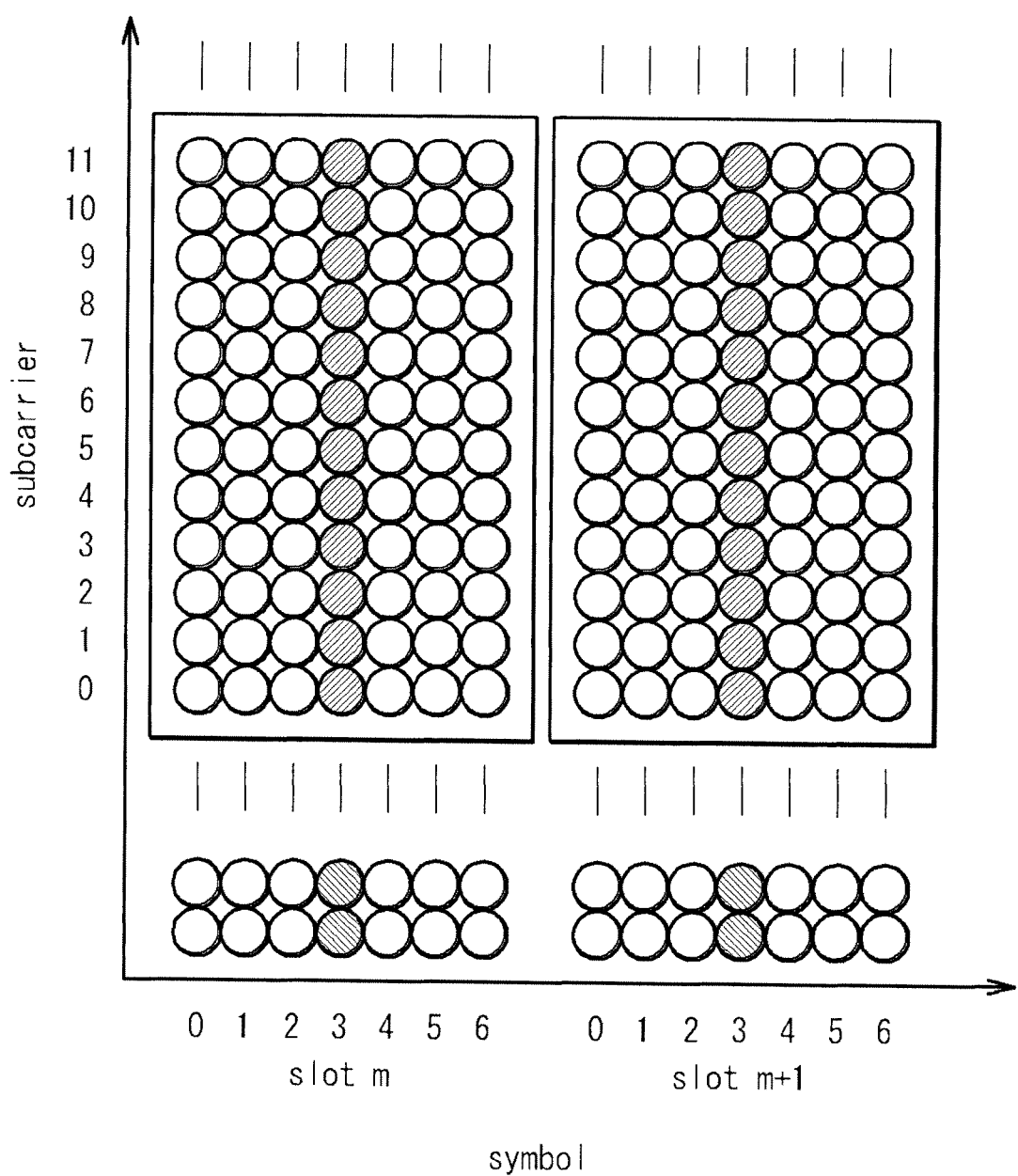
FIG. 6 is a diagram showing how weight interpolation is performed.

In addition, as shown in FIG. 6, a weight for a data subcarrier may be interpolated using SMI weights computed by the weight computation method 1 or 2. For example, when a weight calculated for a resource block corresponding to a slot m shown in FIG. 6 and a weight calculated for a resource block corresponding to a slot m+1 are w (m) and w (m+1), respectively, a weight w (m, 4) for symbol 4 in the slot m in FIG. 6 can be calculated as follows:

$$w(m,4)=(6/7)\times w(m)+(1/7)\times w(m+1).$$

Here, (6/7) and (1/7) are coefficients by which w (m) and w (m+1) are multiplied. The coefficients are set such that the closer the distance (the number of symbols) from the reference signal the larger the value, and the farther the distance from the reference signal the smaller the value. In the above-described equation, for the weight w (m, 4), the weight w (m) for the slot m is considered more and the weight w (m+1) for the slot m+1 is considered less.

When interpolating a weight between slots, in addition to the above-described linear interpolation, a minimum mean square error (MMSE) interpolation method may also be used.

The minimum mean square error interpolation method is represented by the following equation:

$$w(m,4) = v1 \times w(m) + v2 \times w(m+1)$$

when $v = [v1\ v2]^H$, $$v = R^{-1} \times p \quad \text{[Equation 3]}$$

$R^{-1}$: the auto-correlation matrix of the weight
p: the mutual correlation vector between the weight and the interpolation point Note that a correlation value between weights can be obtained by estimation using an appropriate estimation method or by appropriate determination.

In the LTE scheme, since the same user is allocated consecutive resource blocks of the same frequency in the time-axis direction, the correlation between weights is high between resource blocks adjacent to each other in the time-axis direction. Utilizing this fact, by interpolating a weight for a data subcarrier by using weights for resource blocks adjacent to each other in the time-axis direction, a more appropriate weight can be obtained.

In addition, when the processing unit 6 performs an adaptive array process, it is most preferable to use, as a weight computation algorithm, the SMI scheme as described above. In the SMI scheme, since a weight is directly derived from a plurality of sample values, compared with a scheme, such as the LMS scheme, in which an appropriate weight is obtained by performing multiple sequential update processes, even if a weight is derived within a relatively narrow area such as a user allocation area (resource block), an appropriate weight can be obtained.

Figure 7:
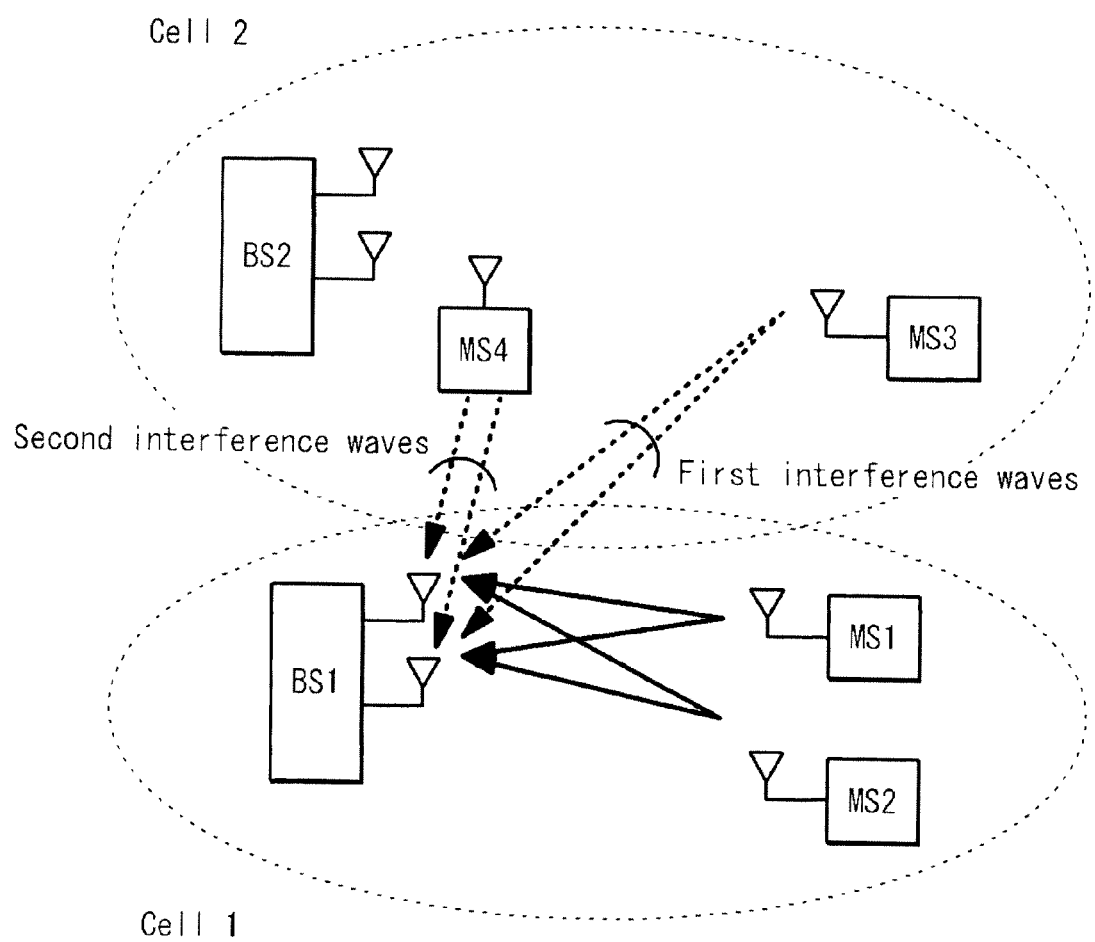
FIG. 7 is a diagram showing how desired waves and interference waves arrive.
Figure 8:
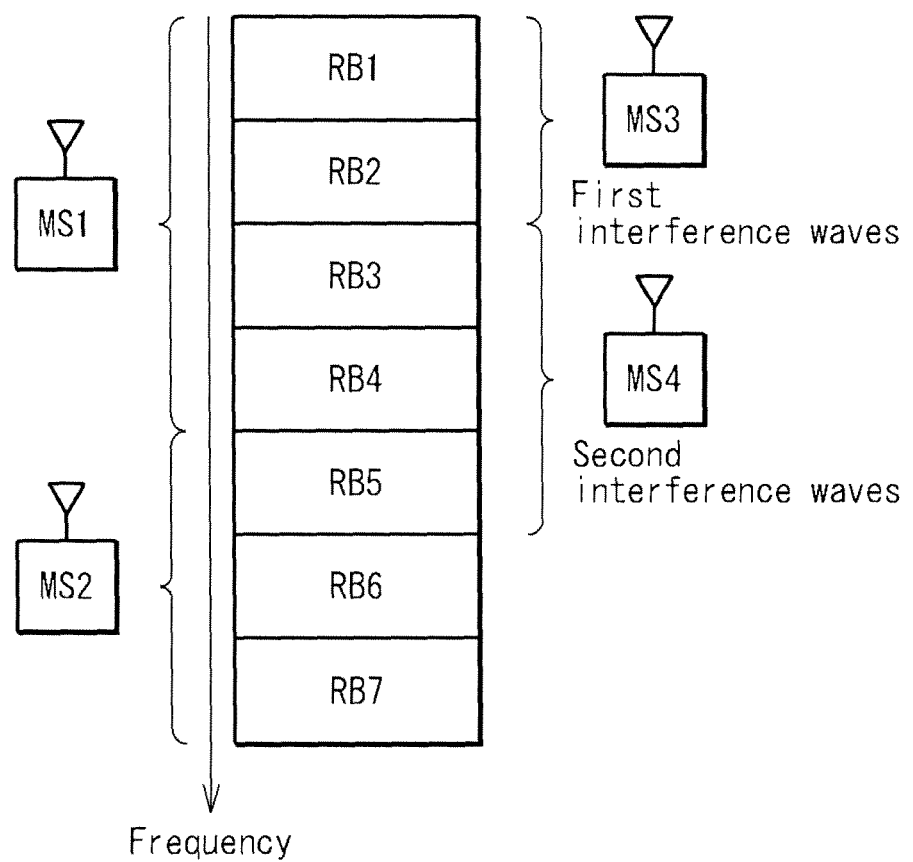
FIG. 8 is a diagram showing bands for desired waves and interference waves.

FIG. 7 and FIG. 8 show advantages brought about by calculating a weight for each resource block which is the minimum user allocation unit. In FIG. 7, the base station apparatus BS1 is in a state of receiving not only signals (desired signals) from desired terminals MS1 and MS2 present in its cell (cell 1), but also interference signals (first interference signals and second interference signals) from interfering terminals MS3 and MS4 present in another cell (cell 2).

Here, as shown in FIG. 8, it is assumed that the base station apparatus BS1 allocates, among seven resource blocks RB1 to RB7, RB1 to RB4 to the desired terminal MS1 present in its cell and allocates RB5 to RB7 to the desired terminal MS2.

In addition, it is assumed that RB1 and RB2 are allocated to the interfering terminal MS3, and RB3 to RB5 are allocated to the interfering terminal MS4.

In this case, when weights are calculated on a user (desired terminal) basis, a plurality of interference waves are included and thus interference removal may not be able to be appropriately performed. For example, among four resource blocks RB1 to RB4 allocated to the desired terminal MS3, the first interference waves from the interfering terminal MS3 are present in RB1 and RB2, and the second interference waves from the interfering terminal MS4 are present in RB3 and RB4. Since the first interference waves and the second interference waves arrive from different directions, to appropriately perform interference removal, different weights need to be used for different interference wave bands. Thus, interference removal cannot be appropriately performed using weights calculated on a user basis.

However, the base station apparatus BS1 needs to know interference wave bands, i.e., user allocation information in another cell (cell 2).

On the other hand, in the present embodiment, as shown below, weights are calculated on a minimum user allocation unit (resource block) basis, but not on a user basis.

Weights on a user basis $(w_1^{user1}, w_2^{user1}), (w_1^{user2}, w_2^{user2})$

Weights on a user RB basis $(w_1^{RB1}, w_2^{RB1}) \ldots (w_1^{RB7}, w_2^{RB7})$ [Equation 4]

When weights are calculated on a minimum user allocation unit (resource block) basis, even if interference wave bands are not known, interference removal can be appropriately performed.

Note that the weight computing unit 62 can also determine areas transmitted from the same user, using user information indicating user allocation, and compute weights using only reference signals in the areas transmitted from the same user.

[Decision Feedback Type MMSE Combining]

Figure 9:
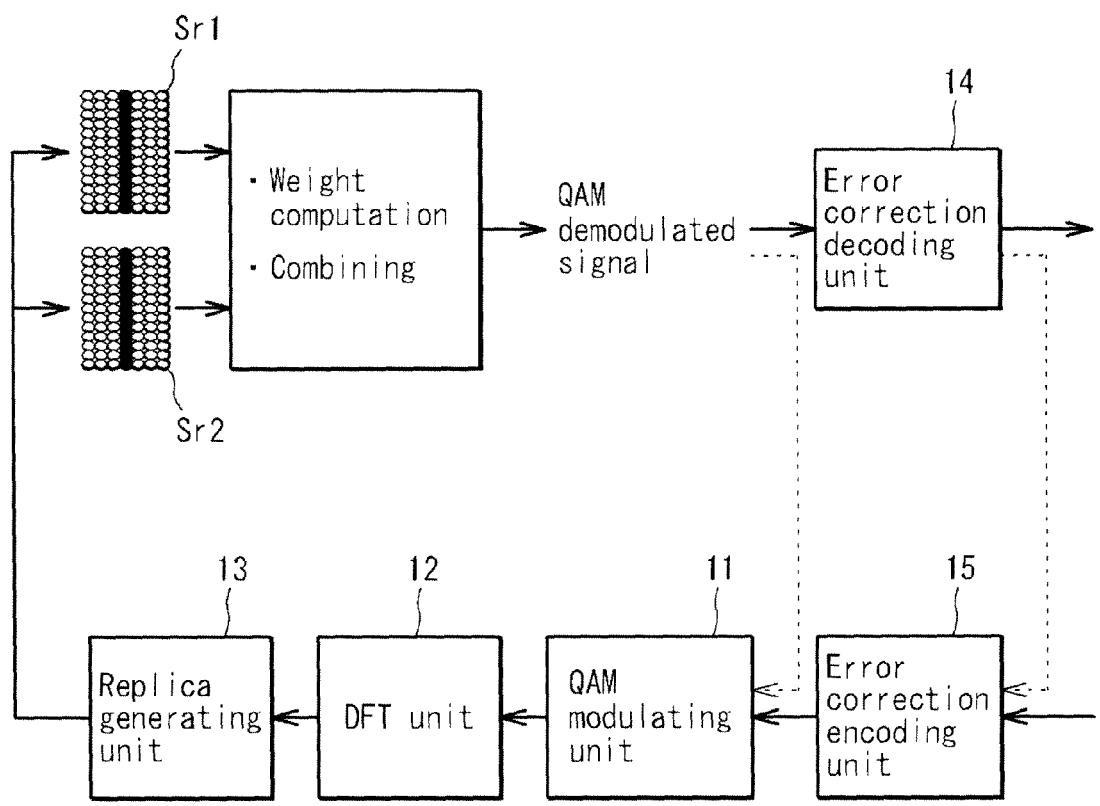
FIG. 9 is a block diagram for decision feedback type MMSE combining.
Figure 10:
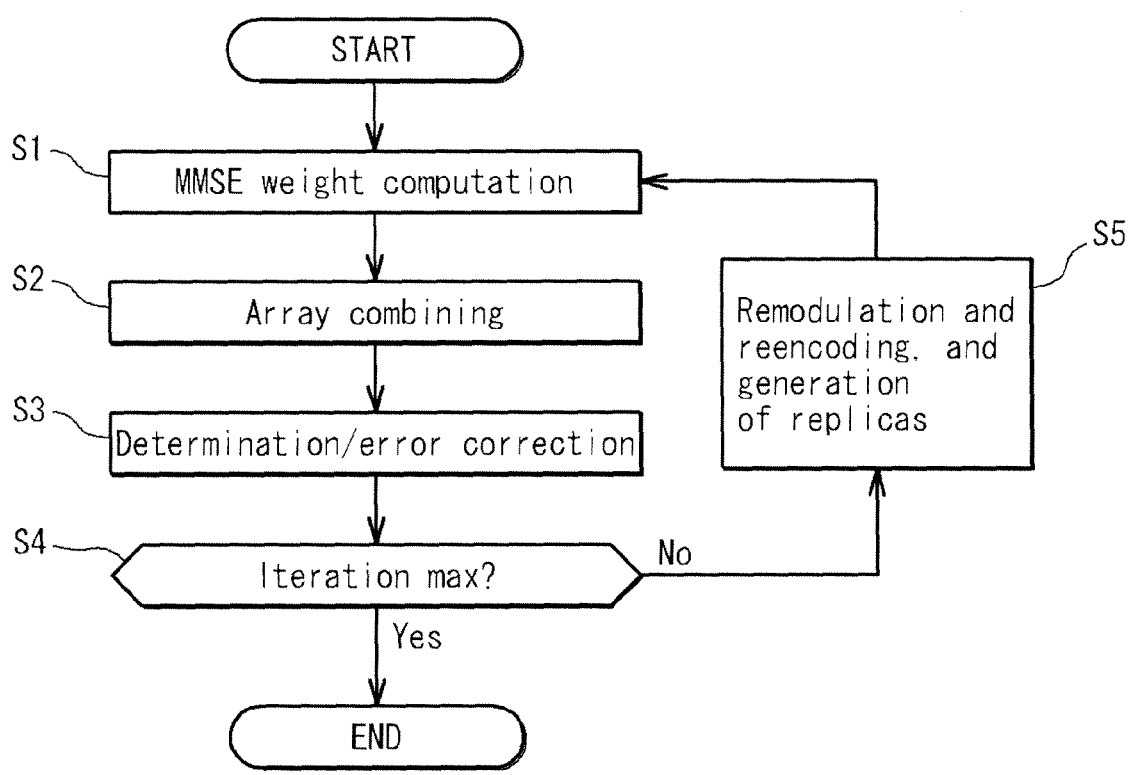
FIG. 10 is a flowchart showing a processing procedure of the decision feedback type MMSE combining.

FIG. 9 and FIG. 10 show a method in which decision feedback type MMSE combining is used for weight computation such as that described above. In the decision feedback type MMSE combining, as shown in FIG. 9, demodulated signals (QAM demodulation) obtained by the circuits in FIG. 4 are modulated again, and the modulated signals are further transformed into frequency domain signals by a DFT (FFT) unit, thereby generating transmitted signal replicas Sr1 and Sr2 of signals transmitted from a user terminal and received by the respective antennas 1a and 1b. The transmitted signal replicas Sr1 and Sr2 are generated for data signals. In addition, the transmitted signal replicas Sr1 and Sr2 are generated on a resource block basis.

The transmitted signal replicas Sr1 and Sr2 for data signals can be treated as known signals, as with reference signals. The weight computing unit 62 in FIG. 4 computes weights using not only reference signals included in each resource block, but also the transmitted signal replicas Sr1 and Sr2 for data signals as virtual reference signals (known signals). The equalizing unit 61 performs array combining using the computed weights. As such, by computing weights using the replicas Sr1 and Sr2, the reference signals are substantially increased in number, enabling to improve weight estimation accuracy.

In addition, replicas Sr1 and Sr2 may be generated by encoding, by an error correction encoding unit 15, signals again which are subjected not only to QAM demodulation but also to error correction decoding by an error correction decoding unit 14, and modulating the encoded signals again by a modulating unit 11. By performing error correction, the accuracy of the replicas Sr1 and Sr2 is improved and thus the weight estimation accuracy is further improved.

FIG. 10 shows a processing procedure of the decision feedback type MMSE combining. First, the weight computing unit 62 performs weight computation (MMSE weight computation) using reference signals and received signals (step S1). Then, the equalizing unit 61 performs array combining using the weights, and determination and/or error correction is further performed for demodulation. If the number of repetitions of steps S1 to S3 has not reached its maximum (step S4), then reencoding is performed, if necessary, on the signals having been subjected to demodulation or the signals having been subjected to error correction, and the signals are further remodulated, thereby generating transmitted signal replicas Sr1 and Sr2.

In the second or subsequent loop of steps S1 to S3, weight computation is performed using the reference signals and the transmitted signal replicas Sr1 and Sr2. By repeating the loop of steps S1 to S3 several times, the accuracy of replicas is improved and thus the weight estimation accuracy can also be improved.

Note that the embodiment disclosed herein are to be considered in all respects as illustrative and not restrictive. The scope of the present invention is indicated by the appended claims rather than by the foregoing meaning, and all changes which come within the meaning and range of equivalency of the claims are therefore intended to be embraced therein.

For example, the communication scheme can be any as long as the SC-FDMA scheme is employed, and thus is not limited to LTE.

In addition, signal combining is not limited to maximum-ratio combining and may be equal-gain combining.

In addition, the number of antenna elements is not limited to two and can be any as long as the number is plural.

REFERENCE SIGNS LIST

BS1 and BS2: BASE STATION APPARATUS
MS1, MS2, and MS3: MOBILE STATION (USER TERMINAL)
1a and 1b: ANTENNA
2a and 2b: FE PROCESSING UNIT
3a and 3b: CP REMOVING UNIT
4a and 4b: SERIAL-TO-PARALLEL CONVERTING UNIT
5a and 5b: FFT UNIT
6: PROCESSING UNIT
61: EQUALIZING UNIT
62: WEIGHT COMPUTING UNIT
63: REFERENCE SIGNAL GENERATING UNIT
7: USER SEPARATING UNIT
8a, 8b, and 8c: IDFT UNIT

| REFERENCE SIGNS LIST | |
|---|---|
| BS1 and BS2: | BASE STATION APPARATUS |
| MS1, MS2, and MS3: | MOBILE STATION (USER TERMINAL) |
| 1a and 1b: | ANTENNA |
| 2a and 2b: | FE PROCESSING UNIT |
| 3a and 3b: | CP REMOVING UNIT |
| 4a and 4b: | SERIAL-TO-PARALLEL CONVERTING UNIT |
| 5a and 5b: | FFT UNIT |
| 6: | PROCESSING UNIT |
| 61: | EQUALIZING UNIT |
| 62: | WEIGHT COMPUTING UNIT |
| 63: | REFERENCE SIGNAL GENERATING UNIT |
| 7: | USER SEPARATING UNIT |
| 8a, 8b, and 8c: | IDFT UNIT |

The invention claimed is:

1. A communication apparatus capable of simultaneously receiving signals from users by a Single Carrier Frequency Division Multiple Access (SC-FDMA) scheme, the communication apparatus comprising:
   a plurality of antennas;
   a receiver circuit including a processing unit configured to perform multi-antenna signal processing on a plurality of SC-FDMA signals in a frequency domain, the plurality of SC-FDMA signals being received by the plurality of antennas; and
   a separating unit that demultiplexes a signal obtained through the multi-antenna signal processing, wherein:
   the processing unit is further configured to calculate weights for the multi-antenna signal processing, on the basis of minimum unit of resource allocation to the users, and to perform the multi-antenna signal processing in the frequency domain, with the plurality of SC-FDMA signals each still including signals for the plurality of users, the plurality of SC-FDMA signals being received by the plurality of antennas, and
   the separating unit is configured to demultiplex the signal obtained through the multi-antenna signal processing, based on user allocation information in the SC-FDMA scheme.

2. The communication apparatus according to claim 1, wherein the processing unit performs multi-antenna signal processing by an adaptive array scheme.

3. The communication apparatus according to claim 1, wherein the processing unit performs multi-antenna signal processing by a diversity scheme.

4. The communication apparatus according to claim 1, wherein the processing unit calculates a weight for a data subcarrier in in the minimum unit, using some of a plurality of reference signals included in the minimum unit, the some reference signals being near the data subcarrier which is a weight calculation target.

5. The communication apparatus according to claim 1, wherein the processing unit calculates a weight for a data subcarrier in the minimum unit, using a weight calculated from a reference signal in the minimum unit, and a weight calculated from a reference signal in another minimum unit adjacent in a time direction to the minimum unit.

6. The communication apparatus according to claim 1, further comprising means for generating transmitted signal replicas of signals received by the respective plurality of antennas, based on demodulated signals obtained by demodulating a signal which is array-combined using weights, the weights being calculated from reference signals included in the received signals, wherein
   the processing unit recalculates the weights using the transmitted signal replicas.

7. The communication apparatus according to claim 1, further comprising means for generating transmitted signal replicas of signals received by the plurality of antennas, based on signals obtained by performing error correction on demodulated signals, the demodulated signals being obtained by demodulating a signal which is array-combined using weights, the weights being calculated from reference signals included in the received signals, wherein
   the processing unit recalculates the weights using the transmitted signal replicas.

8. The communication apparatus according to claim 1, wherein the minimum unit is a resource block in Long-Teen Evolution (LTE).

* * * * *